United States Patent
Kallabis

(10) Patent No.: US 8,661,698 B2
(45) Date of Patent: Mar. 4, 2014

(54) SPIRIT LEVEL

(75) Inventor: Gabriel Kallabis, Spirkelbach (DE)

(73) Assignee: Stabila Messgerate Gustav Ullrich GmbH, Annweiler (DE)

( * ) Notice: Subject to any disclaimer, the term of this patent is extended or adjusted under 35 U.S.C. 154(b) by 0 days.

(21) Appl. No.: 13/088,546

(22) Filed: Apr. 18, 2011

(65) Prior Publication Data

US 2011/0265340 A1 Nov. 3, 2011

(30) Foreign Application Priority Data

Apr. 29, 2010 (DE) .................. 20 2010 005 329 U
Dec. 1, 2010 (EP) .................. 10 193 350

(51) Int. Cl.
*G01C 9/00* (2006.01)
*G01C 9/24* (2006.01)

(52) U.S. Cl.
USPC .............................. 33/379; 33/451

(58) Field of Classification Search
USPC .............. 33/381, 365, 377, 379, 451; D10/69
See application file for complete search history.

(56) References Cited

U.S. PATENT DOCUMENTS

| 285,775 | A | | 9/1883 | Youngs | |
|---|---|---|---|---|---|
| 582,517 | A | * | 5/1897 | Bellows | 33/381 |
| 1,108,134 | A | * | 8/1914 | Cassity | 33/381 |
| 2,633,640 | A | * | 4/1953 | Bucsko | 33/451 |
| 2,695,949 | A | * | 11/1954 | Ashwill | 33/348.2 |
| 2,900,729 | A | * | 8/1959 | Basile | 33/451 |
| 3,832,782 | A | * | 9/1974 | Johnson et al. | 33/451 |
| 5,134,780 | A | | 8/1992 | Butler et al. | |
| 5,940,978 | A | | 8/1999 | Wright et al. | |
| 6,675,490 | B1 | * | 1/2004 | Krehel et al. | 33/382 |
| 7,073,270 | B2 | * | 7/2006 | Kim | 33/451 |
| 7,802,371 | B2 | * | 9/2010 | Ming | 33/347 |
| D625,631 | S | * | 10/2010 | Ben-Josef et al. | D10/69 |
| D627,668 | S | * | 11/2010 | Piencikowski | D10/69 |
| D644,944 | S | * | 9/2011 | Kallabis et al. | D10/69 |
| 2005/0229415 | A1 | | 10/2005 | Kim | |
| 2008/0086901 | A1 | * | 4/2008 | Abrecht | 33/451 |

FOREIGN PATENT DOCUMENTS

| DE | 454471 | 1/1928 |
|---|---|---|
| DE | 2040895 | 2/1972 |
| DE | 8210917 | 8/1984 |
| DE | 8311864 | 5/1985 |
| DE | 9319184 | 3/1994 |
| EP | 1122512 | 8/2001 |
| EP | 1480010 | 11/2004 |

* cited by examiner

*Primary Examiner* — Christopher Fulton
(74) *Attorney, Agent, or Firm* — Ladas & Parry LLP

(57) ABSTRACT

A spirit level including a profiled body with a bottom wall including a first outer measurement surface, a head wall facing this bottom wall, a second outer surface in sections parallel to the measurement surface, and side walls connecting the bottom wall to the head wall, and presenting a first or second outer lateral face. The body includes a bubble vial body. The body presents an asymmetric design on the lateral face over the length of the profiled body, where a first lateral face viewed in the longitudinal direction of the profiled body, presents a channel-shaped course, and a facing second lateral face includes a first section which runs on the head side and has a convex course, and a subsequent second section, whose separation from the vertical axis of the profiled body increases starting from the first section in the direction of the measurement surface.

27 Claims, 1 Drawing Sheet

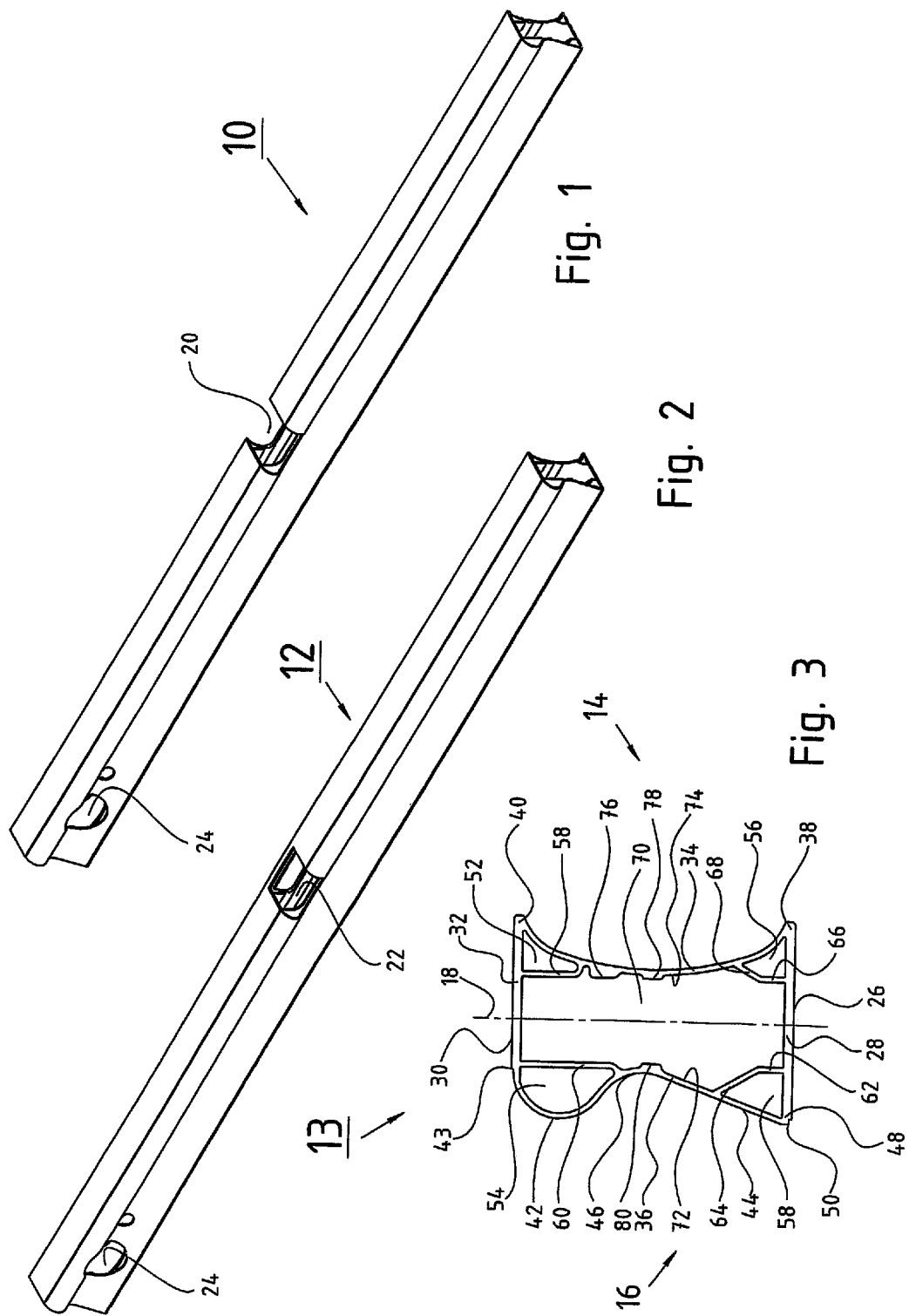

SPIRIT LEVEL

BACKGROUND OF THE INVENTION

The invention relates to a spirit level comprising a profiled body, particularly a hollow chamber profiled body, as spirit level body, with a bottom wall which presents a first outer surface in the form of a measurement surface, a head wall facing this bottom wall, with a second outer surface, which runs at least in sections parallel to the measurement surface, and is in the form of a head surface, as well as side walls which connect the bottom wall to the head wall, and which present, on the one hand, an outer and second lateral face, where, in the profiled body, at least one bubble vial body, whose bubble vial can be optically detected preferably via at least a notch which passes through the head wall, and where the profiled body, with respect to a vertical axis which runs perpendicularly to the measurement surface, presents a design on the lateral face that is asymmetric over the length of the profiled body, and a lateral face, as the first lateral face viewed in the longitudinal direction of the profiled body, presents a channel-shaped course.

A spirit level is a test device for the horizontal or vertical alignment of an object, and it comprises one or more bubble vials which are oriented with respect to a measurement surface. The body of a spirit level can be made of wood, plastic or particularly metal, where rectangular profiled bodies which are sections of an extruded profile are now used commonly. Other profiles, such as, H profiles, are also used.

Independently of the profile geometry, the usual spirit level bodies are generally characterized in that body presents lateral faces, which run symmetrically with respect to its vertical axis, or substantially symmetrically with respect to the vertical axis of the body, where attachments arranged on or at these faces, for example, for bubble vial holders, are not taken into account in this approach. In this sense, the spirit level according to U.S. Pat. No. 285,775 also presents a symmetrical body, which is adapted exclusively in the area of a bubble vial to ensure its reception. The same applies for any stop edges present. In other words, bodies that present slight deviations in some areas in the longitudinal sides are also considered symmetric.

DE-B-11 2005 000 019 discloses a spirit level with bubble vials attached therein, where the spirit level body presents a rectangular profile or consists of an upper cylindrical and a lower trapezoid section.

DE-A-454 471 relates to a spirit level with transverse bubble vial, and it presents a symmetric spirit level body whose lateral faces present a concave course.

The object of DE-A-2 040 895 is a spirit level made of plastic with a body in the shape of a rectangular profile.

A laser beam generator for a spirit level can be obtained from DE-U-93 19 184. The spirit level body consists of a rectangular hollow profile, in which a laser diode is located.

A spirit level with a hollow box-shaped spirit level body is described in DE-U-83 11 864.

An alignment device for placing receiving boxes is the object of DE-U-82 10 917.

U.S. Pat. No. 5,134,780 relates to a spirit level with a double T profile as spirit level body.

U.S. Pat. No. 5,940,978 relates to a spirit level with a body which is composed of two longitudinal sections with trapezoid cross section.

The spirit level body according to US-A-2005/0229415 consists of an upper cylindrical and a lower trapezoid section.

In EP-A-1 122 512, an angle measuring spirit level is described, where the body presents an L-shaped cross section.

EP-A-1 480 010 discloses a spirit level with slidable extensions. Here, the spirit level body presents mutually parallel lateral faces. Because a lateral face is formed in the shape of a channel, the facing lateral face correspondingly presents a convex geometry.

SUMMARY OF THE INVENTION

The invention is based on the problem of further developing a spirit level of the type mentioned in the beginning, in such a way that the spirit level body allows a more secure gripping and handling, from ergonomic points of view, while at the same time making available a stable base. Furthermore, a secure hold, and thus prevention of slipping, should be ensured in case of application to a surface that runs at a slant or vertically.

To solve the problem, the invention substantially provides that the second lateral face is composed of a first section extending on the head side and presenting a convex course, and a subsequent second section, whose separation from the vertical axis of the profiled body increases, starting from the first section, in the direction towards the measurement surface.

In contrast to previously known spirit level bodies, a profiled body is proposed which, with respect to a plane in which its vertical axis is located, presents a design which is asymmetric over the entire length of the profiled body, where a lateral face presents a concave course which can also be referred to as channel-shaped. To this extent, "channel-shaped" and "concave" are synonyms. As a result, a more reliable application against a vertically running surface is possible, because the margins delimiting the concave area allow a linear force exertion on the vertically extending surface, with the consequence that shifting due to a small force exertion is largely prevented.

The first lateral face, which presents a concave or channel-shaped course, is delimited particularly by margins or edges which are in a plane which extends vertically with respect to the measurement surface.

The second lateral face is composed of a first section, which runs on the head side and has a convex course, and a subsequent second section, which is flat in particular, that is which in section runs along a straight line.

According to the invention, a spirit level body is proposed which, in relation to its vertical axis, presents an asymmetric design on the lateral face, over the length of the profiled body, and the lateral faces are not mutually parallel.

Here, it is proposed particularly that the separation of the second section from the vertical axis of the profiled body increases starting from the first section in the direction of the measurement surface, where it is preferred that the first section of the second lateral face, which presents the convex course, protrudes, in sections, laterally over the head surface.

Consequently, a spirit level body with asymmetric profile is proposed, one lateral face of which presents a concave course, and whose other lateral faces are composed of a lower straight section and a subsequent upper convex section.

The described geometry relates to the respective outer surfaces of the longitudinal sides.

As a result of the course of the lower section of the second lateral face, a broader base is obtained, in comparison to known spirit level bodies. In addition, the strength in the direction of the transverse axis is also greater compared to spirit levels with rectangular profile.

As a result of the design of the upper section of the second lateral face, that is due to the convex course, a secure gripping is ensured moreover, where the spirit level is automatically gripped in such a way that the section of the second lateral face which is bent outward is located in the palm of the hand, because the spirit level feels more comfortable in the hand in this case, than in the position in which the concave surface and thus the margin delimiting it is in contact with the palm of the hand.

In particular, the invention provides that the first lateral face, on the head side, is delimited by a longitudinal margin of the head wall, which forms an edge of the profiled body, and, on the bottom side, by a first longitudinal margin of the bottom wall, which forms an edge of the profiled body.

Here, the longitudinal margins should run on the outside in a plane which extends vertically with respect to the bottom surface.

In this way, two drawing aids are available, which are formed by the longitudinal margins or edges of the profiled body, which delimit the first lateral face, and can be applied on a support surface.

The second lateral face is characterized here in that the convex first section transitions continuously into the second section, which, on the outside, forms a plane which runs at an inclination with respect to the bottom surface. Here, the second section, on the bottom side, should be delimited by a second longitudinal margin of the bottom wall, which delimits the measurement surface, and forms an edge of the profiled body.

The edge in this regard forms a drawing edge, where it is provided particularly that said drawing edge presents a step-shaped longitudinal margin notch, so that a correct marking can occur even if, for example, when drawing with India ink. In addition, this results in the measurement surface itself being protected, because its margin does not run in the plane of the lateral face.

Independently thereof, the first section of the second lateral face should start from the head surface.

It is provided preferably that the first section of the second lateral face extends over ½ to ¼, particularly approximately ⅓ of the height of the profiled body.

In a variant to be emphasized, the invention proposes that the profiled body is a hollow chamber profiled body, and presents inner walls that delimit inner chambers, where it is preferred that, in at least one inner chamber, a functional element, such as, a lamp and/or battery is arranged.

Preferred geometries of the profiled body can be obtained from the following characteristics.

Thus, a first inner wall which extends along the vertical axis starting from the head wall can delimit a first inner chamber having a triangular cross section, which inner chamber is delimited, on the outside by a section, which runs on the head side, of the first side wall which presents the first side face.

Alternatively or complementary, a second inner wall extending along the vertical axis starting from the head wall delimits a second inner chamber with cross-sectional geometry in the shape of a segment of a circle, preferably a semicircle, which is delimited by a section of the second side wall which presents, on the outside, the first section of the second lateral face.

To be able to introduce mounting systems with precise positioning, it is provided that the first and second side walls have a step-like design, and present, on the inner side of the profiled body, mutually parallel connection edges or surfaces.

Moreover, it should be emphasized that the notch which allows the optical detection of the bubble vial passes through the first section of the second side wall, the head wall at a separation from its longitudinal margin and head-side area of the first lateral face. As a result, the head-side longitudinal margin of the first side wall is designed so it is continuous, that is, so that the first side wall is delimited in general in the area of the bubble vial by a step.

Due to the design of the lateral faces, the possibility exists to produce, in a single milling process, the notch in the area of the head surface, where the upper edge, which delimits the first lateral face on the head side, is designed so it is continuous, and thus provides an upper drawing aid. In this way, during milling, without transposition, the first side wall, the head wall as well as the second side wall can be produced in sections, in such a way that the upper margin or the upper edge, which delimits the transition between the head wall and the first side wall, is not sectioned; because the first side wall extends, with respect to the upper edge, in the direction of the vertical axis of the profiled body starting from the margin, at first with offset. In this way, the notch can be produced during milling, without shift or change of the milling level.

Thus, a continuous drawing aid is made available, while nonetheless allowing a bubble vial which is inserted in the notch to be optically detected easily both from the lateral faces and also from the head surface.

These measures regarding construction and manufacturing technique must themselves be considered inventive characteristics.

Moreover, a third inner wall can run between the bottom-side area of the second side wall and the bottom wall, and consist of two step-like sections which enclose a concave angle on the side of the vertical axis.

In a variant, a fourth intermediate wall can run between a bottom-side section of the first side wall and the bottom wall, and it can consist of two step-like sections which enclose a concave angle on the side of the vertical axis.

Independently thereof, the profiled body, which is a section of an extruded profile, can be made from plastic or metal.

BRIEF DESCRIPTION OF THE DRAWINGS

Additional details, advantages and characteristics of the invention can be obtained not only from the claims, the characteristics to be obtained from them—individually and/or in combination—, but also from the following description of preferred embodiment examples to be obtained from the drawings.

The figures show:

FIG. 1 a first embodiment of a spirit level body,

FIG. 2 a second embodiment of a spirit level body, and

FIG. 3 a cross section through the spirit level body according to FIG. 1 and FIG. 2, without bubble vials.

DESCRIPTION OF THE PREFERRED EMBODIMENTS

From the figures, in which identical reference numerals are used for identical elements, one can obtain embodiments of spirit level bodies 10, 12, which are characterized in that the longitudinal lateral outer faces 14, 16 present a design which is asymmetric with respect to the vertical axis 18, that is they present a mutually differing course. Furthermore, the outer surfaces 14, 16 do not run parallel to each other. Asymmetry and lack of parallelism are characteristics of the spirit level body 10, 12 according to the invention that should be emphasized.

In corresponding spirit level bodies 10, 12, in notches 20, 22, 24, bubble vial holders with bubble vials are inserted.

Furthermore, the spirit level body consisting of a hollow body profile is closed at the end side with caps made particularly of plastic. However, in this regard, reference is made to constructions that are sufficiently known.

According to the invention, the spirit level body 10, 12 differs from the previously known ones in that, as mentioned, its longitudinal lateral faces 14, 16 present, viewed in the longitudinal direction of the water body 10, 12, an asymmetric course with respect to a plane in which the vertical axis 18 is located. The spirit level bodies 10, 12 differ from each other, with respect to their head-side notches 20, 22 for receiving bubble vial holders. Otherwise, the spirit level bodies 10, 12 are the same, to the extent that these profiled bodies 13 are in the form of sections of an extruded profile. Thus, the asymmetry extends over the entire length of the spirit level body 10, 12.

The hollow profiled body 13 consists, in the usual manner, of a bottom wall 28 which, on the outside, makes available a measurement surface 26, and, facing, a head wall 32 which forms a head surface 30 on the outside side, as well as of step-shaped side walls 34, 36, which present, on the outside, the first lateral face 14 or the second lateral face 16.

The head surface 30 runs, in some sections, parallel to the measurement surface 26, and it can thus also function as a measurement surface.

The first lateral face 14 presents a channel-shaped or concave course. The first lateral face 14, and thus the first side wall 34, is delimited by longitudinal margins 38, 40 of the profiled body 13, which are thus longitudinal edges of the latter. The edges consequently form the line of intersection between the head wall 32 and the first side wall 34 or between it and the bottom wall 28.

The channel-shaped course can, in cross section, correspond to an arched, roof-shaped or trapezoid geometry, to mention only some examples of shapes that present a channel shape or a concave course.

The second lateral outer face 16 presents an upper or first section 42 which has a convex course, and a lower or second section 44 which spans a plane, which, on the outside, in cross section, lies along a straight line. Here, the upper section 42 transitions preferably continuously into the lower straight-line section 44, resulting in a concave section 46 in the transition area.

The upper or first section 42 of the second longitudinal side 16, which has a convex course, extends preferably over approximately ⅓ of the height of the spirit level body 10, 12.

As can be seen in the drawn representation of FIG. 3, the separation between the second section 44, that is the straight-line section, and the vertical axis 18 of the profiled body, increases, starting from the end of the first section 42, in the direction towards the measurement surface 26. The result is a relatively broad measurement surface 26, and thus base for the spirit level body 10, 12 and consequently for the spirit level itself.

The bottom part of the spirit level body 10, 12, which comprises the second section 44, thus presents, in cross section, the geometry of an asymmetric trapezoid.

Furthermore, the first section 42, with convex course on the outside, protrudes laterally over the head surface 30.

From the drawn representation—which for the rest is self explanatory—one can see moreover that the longitudinal margins or edges 38, 40, which delimit the first side wall 34, run in a plane which extends perpendicularly to the measurement surface 26.

The measurement surface 26 is delimited by the lower longitudinal margin or the lower longitudinal edge 38 of the profiled body 13 as well as by a second longitudinal margin or longitudinal edge 48, in which the second section 44 of the second longitudinal side 46 ends. Here, a step 50 runs in the longitudinal direction of the second longitudinal margin 48, and serves as a drawing aid just like the delimitations of the measurement surface 26 or of the head surface 30, that is the longitudinal margins 38, 40.

Due to the asymmetric course of the lateral faces 14, 16, the profiled body 13 or the spirit level body 10, 12, and thus the spirit level, presents an ergonomically advantageous design, which facilitates the ease of handling; indeed, as a result of the presence of the longitudinal margins 38, 40, and the concave area of the spirit level body 10, 12, which extends between said longitudinal margins, and the presence of the convex upper first section 42 on the facing longitudinal side, the spirit level body 10, 12 is gripped automatically in such a way that the convex area comes to lie in the palm of the hand, because otherwise the longitudinal margin 40 or 38 would have an interfering effect. The concave or channel-shaped first lateral face 14 is consequently contacted by fingers of a hand.

Due to the geometry of the spirit level body 10, 12, and due to the longitudinal margins 38, 40, a secure application of the spirit level body 10, 12 against an inclined or vertically running surface is possible, where a linear contact is obtained, with the consequence that a secure fixation occurs, with small force exertion on the spirit level body 10, 12. In this way, a secure alignment of the spirit level and a drawing of lines can occur.

As illustrated in the representation, the spirit level body 10, 12, that is the profiled body 13, presents inner chambers 52, 54, 56, 58 which, in the respective upper and lower margin, that is in the area of the head wall 32 and of the bottom wall 28, extend in the longitudinal direction of the profiled body. The first inner chamber 52 is delimited by a step-like first intermediate wall 58, which runs approximately parallel to the vertical axis 18, and delimits a first chamber 52 with a triangular cross section, which is closed off, on the outside, by the first side wall 38. The second inner chamber 54 presents, in cross section, a geometry that is approximately in the shape of a segment of a circle, and it is delimited by a step-like second inner wall 60 which runs parallel to the vertical axis 18.

In the area of the lower longitudinal edges or margins 38, 40, the third and fourth inner chambers 56, 58 extend, which are delimited, on the side of the vertical axis, by step-like walls 62, 64 of 66, 68, which enclose a concave angle, on the side of the vertical axis.

The inner chambers 52, 54, 56, 58 can serve, for example, for the reception of functional elements, such as, a battery, lamp, diode, chip. The same applies to the inner chamber 70 which is delimited by the inner walls 58, 60, 62, 64, 66, 68 and the remaining free surfaces of the side walls 34, 36.

Furthermore, starting from the inner surfaces 72, 74 of the side walls 34, 36, stop edges or protrusions 76, 78, 80 can start, which serve for the guided reception of functional elements.

The notches 20, 22, 24 can be milled out of the profiled body 13. Here, particularly in the embodiment of FIG. 2, the advantage is that the drawing aids, which are formed by the upper edge and the upper longitudinal margin 40, are designed continuously, without optically covering the bubble vial inserted in the notch 22 to an extent such that there is interference with the detection of the lateral faces 14, 16 and of the head surface 30. The notch 22 can, furthermore, be produced in a single milling process, without any transposition occurring; indeed, when milling along the vertical axis— but also along the transverse axis—it is possible, in a single work step, to remove by milling areas of the upper convex section 42 of the side wall 36, the intermediate wall 60, the head wall 32, the inner wall 58, as well as areas of the first side wall 34 delimiting the first inner chamber 52, without the longitudinal margin 60 being interrupted, and thus leaving a step, after the milling, in the area of the notch 22. This is due to the geometric design of the profiled body, because the first side wall 34 decreases separation-wise starting from the longitudinal margin or the longitudinal edge 40, in the direction of the vertical axis 18.

The spirit level body 10, 12, as mentioned, is a hollow profiled body and a section of an extruded profile, particularly one made of metal. Naturally, the extruded profile can also be made of plastic.

The extruded profile, with respect to its vertical axis 18 which runs perpendicularly to the measurement surface 26 and the head surface 30, is asymmetric over its length, that is, the outer walls running along the vertical axis 18 do not extend symmetrically with respect to a plane which runs perpendicularly to the measurement surface 26, and in which the vertical axis 18 is located. One of the outer walls presents, on the outside, a channel-shaped course, and the facing outer wall presents, on the outside, a section which is arched outward and, starting from that section, a flat section whose separation, starting from the arched section, increases towards the vertical axis in the direction of the wall which makes available the measurement surface.

What is claimed is:

1. Spirit level comprising a profiled body, as spirit level body, with a bottom wall which makes available a first outer surface in the form of a measurement surface, a headwall facing this bottom wall, with a second outer surface, which runs at least in sections parallel to the measurement surface, and is in the form of a head surface, as well as side walls, which connect the bottom wall to the head wall, and which present, on the one hand, a first outer lateral face, and, on the other hand, a second outer lateral face, where the profiled body presents at least one bubble vial body, whose bubble vial can be optically detected, and where the profiled body, with respect to its vertical axis which runs perpendicularly to the measurement surface, presents a design on the lateral face that is asymmetric over the length of the profiled body, and a lateral face, as the first lateral face viewed in the longitudinal direction of the profiled body, presents a channel-shaped course,
wherein the second lateral face comprises a first section, which runs on the head side and presents a convex course, and a subsequent second section whose separation from the vertical axis of the profiled body increases starting from the first section in the direction of the measurement surface.

2. Spirit level according to claim 1, wherein the first lateral face, on the head side, is delimited by a longitudinal margin of the head wall, which forms an edge of the profiled body, and, on the bottom side, by a first longitudinal margin of the bottom wall, which forms an edge of the profiled body, where the longitudinal margins extend on the outside in a plane which extends perpendicularly to the measurement surface.

3. Spirit level according to claim 1, wherein the first section of the second lateral face, which presents the convex course, protrudes laterally over the head surface.

4. Spirit level according to claim 3, wherein the first section of the second lateral face transitions continuously into the second section, which forms a plane that runs at an inclination with respect to the bottom surface.

5. Spirit level according to claim 1, wherein the second section, on the bottom side, is delimited by a second longitudinal margin of the bottom wall, which delimits the measurement surface and forms an edge of the profiled body.

6. Spirit level according to claim 5, wherein the second longitudinal margin of the bottom wall protrudes laterally over the first section of the second lateral face.

7. Spirit level according to claim 6, wherein the first section extends over ½ to ¼ of the height of the profiled body.

8. Spirit level according to claim 7, wherein the first section extends over approximately ⅓ of the height of the profiled body.

9. Spirit level according to claim 5, wherein the edge of the profiled body presents a step-shaped longitudinal notch which serves as drawing edge.

10. Spirit level according to claim 1, wherein the profiled body presents inner walls delimiting inner chambers.

11. Spirit level according to claim 10, wherein in at least one inner chamber, a functional element is arranged.

12. Spirit level according to claim 11, wherein the functional element is selected from the group consisting of a lamp and a battery.

13. Spirit level according to claim 10, wherein a first inner wall, extending along the vertical axis and starting from the head wall, delimits a first inner chamber with a triangular cross section, which is delimited on the outside by a section of the first side wall which runs on the head side, and which presents the first lateral face.

14. Spirit level according to claim 10, wherein a second inner wall, extending along the vertical axis starting from the head wall, delimits a second inner chamber, which, in cross section, presents approximately the geometry of a segment of a circle, and which is delimited by a section of the second side wall, which, on the outside, presents the first section of the second lateral face.

15. Spirit level according to claim 14, wherein the cross-section geometry is approximately a semicircle.

16. Spirit level according to claim 10, wherein a third inner wall runs between the bottom-side area of the second side wall and the bottom wall, and consists of two step-like sections which, on the side of the vertical axis, enclose a concave angle.

17. Spirit level according to claim 10, wherein a fourth intermediate wall runs between a bottom-side section of the first side wall and the bottom wall, and consists of two step-like sections which, on the side of the vertical axis, enclose a concave angle.

18. Spirit level according to claim 1, wherein the first section of the second lateral face starts over a step from the head surface.

19. Spirit level according to claim 1, wherein the notch which allows the optical detection of the bubble vial, passes through the first section of the second lateral face, the head wall at a separation from its longitudinal margin and head-side area of the first lateral face.

20. Spirit level according to claim 1, wherein head-side longitudinal margin of the first side wall is designed to be continuous, where the notch is produced in a milling process.

21. Spirit level according to claim 20, wherein the milling process is a shift-free milling process parallel to the vertical axis, and wherein the milling process is carried out at constant milling depths.

22. Spirit level according to claim 1, wherein the hollow profiled body is a section of an extruded profile.

23. Spirit level according to claim 22, wherein the extruded profile comprises longitudinal steps forming the inner walls.

24. Spirit level according to claim 1, wherein the width extension of the measurement surface is greater than the width extension of the head surface running parallel to the measurement surface.

25. Spirit level according to claim 1, wherein the first and the second side wall have a step-like design, and they present, on the inner side of the profiled body, mutually parallel connection edges or surfaces.

26. Spirit level according to claim 1, wherein the profiled body is a hollow chamber profiled body.

27. Spirit level according to claim 1, wherein the bubble vial is detected via at least a notch which passes through the head wall.

\* \* \* \* \*